T. H. BOURKE.
Piston-Packing for Blower-Cylinders.
No. 196,627. Patented Oct. 30, 1877.
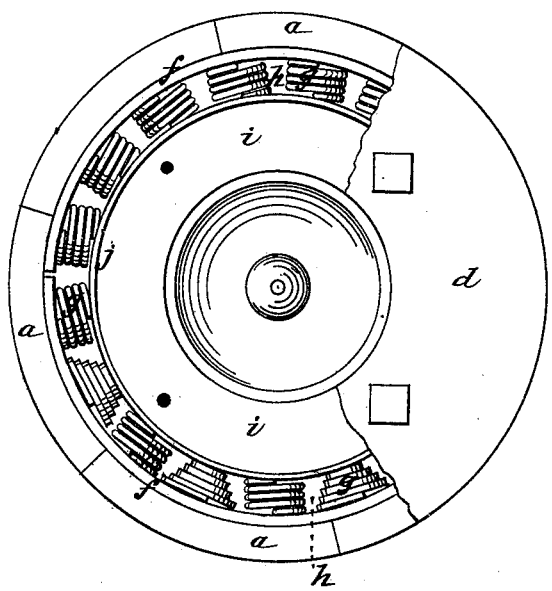
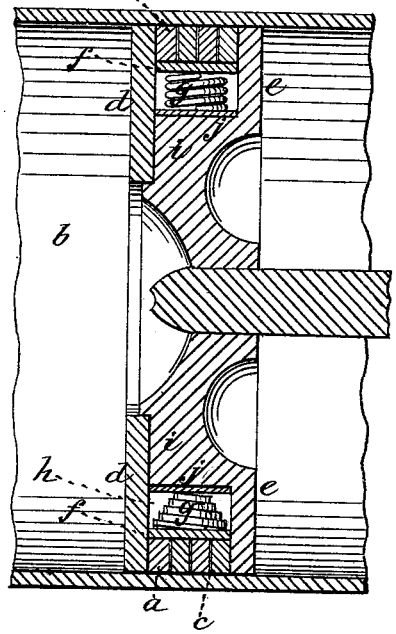
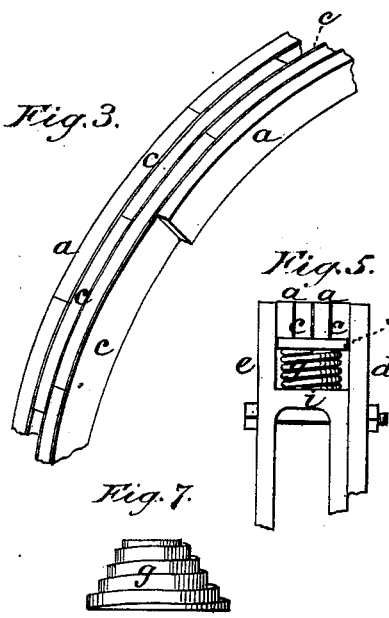
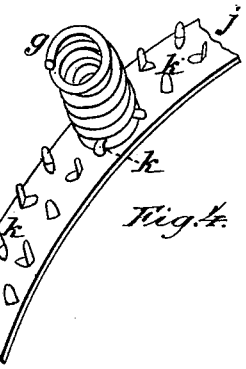
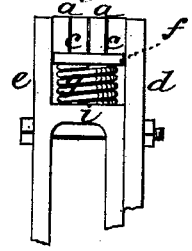
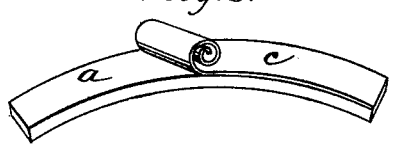

UNITED STATES PATENT OFFICE.

THOMAS H. BOURKE, OF YOUNGSTOWN, OHIO, ASSIGNOR OF TWO-THIRDS HIS RIGHT TO LLOYD BOOTH AND JOHN MILLER, OF SAME PLACE.

IMPROVEMENT IN PISTON-PACKING FOR BLOWER-CYLINDERS.

Specification forming part of Letters Patent No. 196,627, dated October 30, 1877; application filed June 16, 1877.

*To all whom it may concern:*

Be it known that I, THOMAS H. BOURKE, of Youngstown, in the county of Mahoning and State of Ohio, have invented certain new and useful Improvements in Packing for Piston-Heads of Blowing-Cylinders for Blast-Furnaces; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to piston-heads of blowing-cylinders for blast-furnaces in which a wooden packing is used. The wooden packing is composed of segments of any given circle, and a number of complete circles are formed by such segments, arranged so as to break joints. The wooden segments thus arranged form a packing of any desired width; and, for the purpose of allowing the follower of the piston to be screwed up tight against the wood packing-rings, and yet allow the rings to expand radially to conform to any inequalities of the cylinder, I place between each of the wooden packing-rings thus formed a layer or layers of rubber cloth, felt, or woolen cloth, and thus allow each segment to have, if need be, a free and independent adjustment to conform to the interior surface of the cylinder, and make a better and more durable packing. The packing thus constructed is supported upon a base-ring, which may be of a series of segments, or have a single cut, so as to be forced outward with the packing by a series of springs arranged in an annular space and secured in a peculiar manner to a thin metallic band fitted upon an interior hub of the piston-head, whereby the springs are held in place. As the springs are used in spiral form, and within an uninterrupted space, it is important that they should be held in proper position; and for this purpose I secure them all to a thin metallic band, by upsetting lips therefrom of a length sufficient to be lapped and clinched over the bottom coils of the springs, thus forming a band of springs which can be inserted in place as an entirety.

In the drawings, Figure 1 represents a section of the cylinder of a blast-furnace embracing my invention; Fig. 2, the piston-head, with part of the follower broken away. Fig. 3 shows a portion of the segmental wooden packing and the intermediate fabric layers; Fig. 4, a portion of the thin metal band with its upset lips by which to fasten the spring-coils thereto; Fig. 5, a section of the packing portion of the piston-head, of slightly different form; Fig. 6, one of the wooden packing-segments with the fabric layer turned up at one end; and Fig. 7, a spring of helical form arranged at the under portion of the piston in horizontal cylinders.

The wooden segments $a$ are of suitable thickness, and sawed to a circle adapted to that of the cylinder $b$, in which they are to be used. They may be of any desired length and width, and they are arranged side by side in a manner to break joints, as shown in Fig. 3, and to form a packing of any desired width. When so arranged each line of segments forms a wooden ring, and between each two of the series of wooden rings I place a layer of rubber cloth, woolen, or of any flexible fabric, $c$, of a width equal to that of the segments, by which the segments may be pressed or forced by the follower $d$ hard against each other and against the inner side of the piston-head $e$, and yet allow the segments to have free and independent movements outward to conform to any inequalities in the inner surface of the cylinder.

A ring, $f$, of segments, or cut at a single point, forms a seat and support for the wooden packing, and is forced outward by the action of a series of coiled springs, $g$, arranged in an annular space, $h$, formed between a hub, $i$, of the piston and the said band or ring $f$.

To secure these springs in their proper places, they are mounted upon a thin strip, $j$, of metal, by lips $k$, upset from said band long enough to be bent and clinched over the inner coils of said springs, and when so fastened the band is strapped or seated around the piston-hub, and thus becomes a single fixture with the springs. This is important as a simple means to hold the springs equidistant from each other. The piston-hub, while serving the purpose described, serves also as a means for securing the follower in place.

In upright cylinders the springs may be of the usual spiral form and having equal tension; but in horizontal cylinders I make the lower group of springs of helical form, as shown in Fig. 7, and having a tension greater than that of the others, for the purpose of exerting a force tending to lift the piston-head, and thus counteract the unequal wear which would occur at the lower side of the piston.

It will be observed that the segments $a$ form the piston-packing proper, and that the thin woven fabric strips $c$, interposed between said segments, form no part of the packing-surface; and have no packing function, as, by reason of their thinness, they have no body, but are mere separating-strips of cloth. They simply serve to give better freedom for the independent movement of the packing-segments, to conform to any inequalities in the interior walls of the cylinder. They do not themselves conform to such inequalities. They are, therefore, unlike a packing composed of wood or iron and leather or rubber rings, which alike constitute the wearing-surface and expand and contract together.

I claim—

1. The combination, with segments $a$, forming the piston-packing proper, of the thin strips of woven fabric $c$, interposed between said packing-segments to give them freedom for independent movement over and upon said thin strips, as described.

2. The ring $f$, cut at a single point, forming a continuous seat and support for packing-segments, arranged to break joints with the springs $g$, arranged within an unobstructed annular space, $h$, and supporting said divided ring and packing-segments at all points alike, as described.

3. The annular unobstructed space $h$, the springs $g$, the ring $f$, and the band $j$, arranged within said annular space for operation with the segmental packing-rings $c$, as described.

4. The springs combined with a thin metal strip, to which they are secured by upset lips, for the purpose stated.

5. The combination, with the thin metal strip of springs, the segmental wooden packing, and the ring-seat thereof, of the interior piston-hub upon which said strip is seated.

6. In horizontal blowing-cylinders, the lower group of helical springs, in combination with the springs of spiral form, for the purpose described.

In testimony that I claim the foregoing I have affixed my signature in the presence of two witnesses.

THOMAS H. BOURKE.

Witnesses:
W. A. BUCHER,
LLOYD BOOTH.